(12) United States Patent
Lee et al.

(10) Patent No.: US 11,359,118 B2
(45) Date of Patent: Jun. 14, 2022

(54) ADHESIVE COMPOSITION HAVING EXCELLENT KISSTACK

(71) Applicant: LG Chem, Ltd., Seoul (KR)

(72) Inventors: Kum Hyoung Lee, Daejeon (KR); Dong Jo Ryu, Daejeon (KR); Jung Sup Han, Daejeon (KR); Sung Jong Seo, Daejeon (KR); Jung Eun Yeo, Daejeon (KR); Hyun Ju Cho, Daejeon (KR)

(73) Assignee: LG Chem, Ltd.

( * ) Notice: Subject to any disclaimer, the term of this patent is extended or adjusted under 35 U.S.C. 154(b) by 85 days.

(21) Appl. No.: 16/330,859

(22) PCT Filed: Dec. 21, 2017

(86) PCT No.: PCT/KR2017/015258
§ 371 (c)(1),
(2) Date: Mar. 6, 2019

(87) PCT Pub. No.: WO2018/117694
PCT Pub. Date: Jun. 28, 2018

(65) Prior Publication Data
US 2019/0218433 A1 Jul. 18, 2019

(30) Foreign Application Priority Data

Dec. 21, 2016 (KR) .................. 10-2016-0176071
Dec. 20, 2017 (KR) .................. 10-2017-0176446

(51) Int. Cl.
| | |
|---|---|
| *C09J 133/06* | (2006.01) |
| *C09J 133/08* | (2006.01) |
| *C09J 133/12* | (2006.01) |
| *C08L 93/04* | (2006.01) |
| *C09J 7/38* | (2018.01) |
| *G09F 3/10* | (2006.01) |
| *C08F 220/18* | (2006.01) |
| *C08F 2/22* | (2006.01) |
| *C08F 220/30* | (2006.01) |

(52) U.S. Cl.
CPC .............. *C09J 133/08* (2013.01); *C08F 2/22* (2013.01); *C08F 220/1808* (2020.02); *C08L 93/04* (2013.01); *C09J 7/385* (2018.01); *C09J 133/066* (2013.01); *C09J 133/12* (2013.01); *G09F 3/10* (2013.01); *C08F 220/302* (2020.02); *C08F 220/303* (2020.02); *C08F 2810/20* (2013.01); *C09J 2203/334* (2013.01); *C09J 2301/414* (2020.08); *C09J 2400/283* (2013.01); *C09J 2425/00* (2013.01); *C09J 2431/00* (2013.01); *C09J 2433/00* (2013.01); *Y10T 428/2891* (2015.01)

(58) Field of Classification Search
None
See application file for complete search history.

(56) References Cited

U.S. PATENT DOCUMENTS

| | | | | |
|---|---|---|---|---|
| 5,183,459 | A * | 2/1993 | Bernard | A61F 13/0269 602/52 |
| 6,620,870 | B1* | 9/2003 | Gerst | C09J 133/066 524/577 |
| 2005/0266184 | A1* | 12/2005 | Kobayashi | G03G 7/0046 428/32.38 |
| 2006/0263600 | A1 | 11/2006 | Bartholomew et al. | |
| 2008/0220249 | A1* | 9/2008 | Saitou | C09J 133/066 428/337 |
| 2008/0286570 | A1 | 11/2008 | Coutey et al. | |
| 2011/0151220 | A1* | 6/2011 | Shirai | C09J 7/50 428/215 |
| 2013/0030110 | A1 | 1/2013 | Okada et al. | |
| 2013/0202885 | A1 | 8/2013 | Dodge et al. | |
| 2015/0344746 | A1* | 12/2015 | Ha | C09J 133/08 524/747 |
| 2021/0122845 | A1* | 4/2021 | Lee | C08F 2/00 |
| 2021/0230463 | A1* | 7/2021 | Seo | C09J 133/08 |

FOREIGN PATENT DOCUMENTS

| | | |
|---|---|---|
| CN | 101864258 A | 10/2010 |
| CN | 102803418 A | 11/2012 |
| JP | H0925472 A | 1/1997 |
| KR | 100647866 B1 | 11/2006 |
| KR | 20080019624 A | 3/2008 |
| KR | 20130141340 A | 12/2013 |
| KR | 20140123950 A | 10/2014 |
| KR | 20150015707 A | 2/2015 |

(Continued)

OTHER PUBLICATIONS

Song, Kong et al., "Pressure-Sensitive Adhesive Composition Having Excellent Kisstack and Kisstack Measurement Method Thereof", machine translation of KR 20150022382A, Mar. 4, 2015 (Year: 2015).*

(Continued)

*Primary Examiner* — Anish P Desai
(74) *Attorney, Agent, or Firm* — Lerner, David, Littenberg, Krumholz & Mentlik, LLP

(57) ABSTRACT

The an adhesive composition characterized in that the kisstack, which is defined as the force measured when a sheet coated with the adhesive composition is instantaneously peeled off after being attached, is about 6 N/inch or higher. The composition not only has excellent loop tack but also exhibits high kisstack characteristics, and thus can be widely used for various substrates.

17 Claims, No Drawings

(56) References Cited

FOREIGN PATENT DOCUMENTS

| KR | 20150022382 A | 3/2015 | | |
|---|---|---|---|---|
| KR | 20150033596 A | 4/2015 | | |
| KR | 20160011683 A | 2/2016 | | |
| WO | WO-2014058199 A1 * | 4/2014 | ............. | C09J 11/06 |
| WO | WO-2015064282 A1 * | 5/2015 | ............ | C09J 123/12 |

OTHER PUBLICATIONS

Definition "art paper" from Merriam-Webster dictionary, Jul. 30, 2020 (Year: 2020).*
Gongju, Song et al., "Pressure Sensitive Adhesive Composition With Excellent Kisstack", English translation of KR10-20150022382A, Mar. 4, 2015 (Year: 2015).*
Extended European Search Report including Written Opinion for Application No. EP17883498.2, dated Jul. 8, 2019, pp. 1-6.
Search report from International Application No. PCT/KR2017/015258, dated Mar. 30, 2018.
Chinese Search Report for Application No. CN2017800586359 dated Aug. 12, 2020, 2 pgs.

* cited by examiner

ADHESIVE COMPOSITION HAVING EXCELLENT KISSTACK

CROSS-REFERENCE TO RELATED APPLICATIONS

This application is a national phase entry under 35 U.S.C. § 371 of International Application No. PCT/KR2017/015258, filed on Dec. 21, 2017, which claims priority to Korean Patent Application No. 10-2016-0176071 filed on Dec. 21, 2016, and Korean Patent Application No. 10-2017-0176446 filed on Dec. 20, 2017, the entire contents of which are incorporated herein by reference.

TECHNICAL FIELD

The present invention relates to an adhesive composition having excellent kisstack.

BACKGROUND OF THE INVENTION

Adhesive labels commonly referred to as labels or label stickers are used in most industrial fields such as printing, chemistry, medicine, cosmetics, food industry, household electric appliances, automobiles, stationery, etc. as well as for product trademarks and advertisements. Generally, as a material of an adherend with which an adhesive label is attached, paper such as art paper, imitation paper, mirror paper, gold and silver paper, heat sensitive paper, kraft paper, fluorescent paper, sterilized paper, photographic paper, and the like, and films such as PET, PVC, PE, PP, PS, PI, and the like are used, and can usually be applied to the final product through regular printing on the surface.

For the adhesive used for such adhesive labels, its adhesive strength is determined depending on its application. For example, a permanent adhesive exhibits a strong adhesive strength of about 8 N/inch or more based on peel strength of 180 degrees using a standard adherend, but when paper is used as a surface paper, paper breakage occurs at the time of removal. On the other hand, a removable adhesive exhibits an adhesive strength of about 5 to 8 N/inch based on a peel strength of 180 degrees using a standard adherend, and if necessary, it shows adhesive strength at a level that allows removal, and it is mostly used for applications that temporarily adhere labels. That is, the adhesive can be classified into applications that are permanently or temporarily attached depending on the purpose.

Adhesive labels require high adhesion to be applied to containers having not only hard surfaces such as cement walls or steel plates, but also flexible surfaces such as plastic containers of cosmetics or pharmaceutical products, fancy goods, and the like. In general, there are an initial tack and shear resistance as items indicating the physical properties of the adhesive, and in addition, depending on the detailed classification of the product group and application, there are various test methods such as low temperature adhesion, adhesion strength after aging, dimensional stability, chemical resistance, mandrel hold, and the like. Usually, the permanent adhesive is a product that is excellent in both initial tack and shear resistance, and a limit exists for exhibiting the characteristics of the permanent adhesive only by the above physical properties.

In particular, an adhesive is generally prepared by copolymerizing an acrylic monomer, but it shows low kisstack properties compared to initial tack and peel strength, and thereby, a limit exists for increasing a kisstack only by the content of molecular weight modifier. Therefore, there is a need to study compositions showing excellent adhesion to various substrates requiring adhesion to not only flexible surfaces such as plastic containers but also to hard surfaces such as cement walls.

DETAILS OF THE INVENTION

Objects of the Invention

It is an object of the present invention to provide an adhesive composition not only having excellent initial tack but also exhibiting high kisstack characteristics.

It is another object of the present invention to provide an adhesive sheet using the above-described adhesive composition.

Means for Achieving the Object

According to one embodiment of the present invention, an adhesive composition including: acrylic emulsion resin particles; and 1 to 45 parts by weight of a water dispersible tackifier based on 100 parts by weight of the acrylic emulsion resin particles, wherein the acrylic emulsion resin particles are obtained by reaction between a (meth)acrylic acid ester monomer having a C1-C14 alkyl group, and 0.1 to 4.5 parts by weight of a monomer having a carboxyl group and/or a hydroxy group, or a mixture thereof, 0.5 to 12 parts by weight of a styrene-based monomer, 1 to 30 parts by weight of a vinyl acetate-based monomer, 0.01 to 2 parts by weight of a molecular weight modifier, and 0.01 to 2 parts by weight of a crosslinking agent, based on 100 parts by weight of the (meth)acrylic acid ester monomer, is provided.

As an example, the (meth)acrylic acid ester monomer having the C1-C14 alkyl group may be at least one selected from the group consisting of methyl (meth)acrylate, ethyl (meth)acrylate, propyl (meth)acrylate, isopropyl (meth)acrylate, butyl (meth)acrylate, t-butyl (meth)acrylate, 2-ethylhexyl (meth)acrylate, octyl (meth)acrylate, and lauryl (meth)acrylate.

The monomer having a carboxyl group may be at least one selected from the group consisting of maleic anhydride, fumaric acid, crotonic acid, itaconic acid, acrylic acid, and methacrylic acid.

The monomer having a hydroxy group may be at least one selected from the group consisting of hydroxyethyl (meth)acrylate, hydroxypropyl (meth)acrylate, hydroxybutyl (meth)acrylate, hydroxyhexyl (meth)acrylate, hydroxyoctyl (meth)acrylate, hydroxylauryl (meth)acrylate, and hydroxypropyl glycol (meth)acrylate.

The styrene-based monomer may be at least one selected from the group consisting of styrene and α-methylstyrene.

The vinyl acetate-based monomer may be at least one selected from the group consisting of vinyl acetate, vinyl propionate, vinyl laurate, and vinyl pyrrolidone.

The water dispersible tackifier may be at least one selected from the group consisting of rosin-based, terpene-based, xylene-based, petroleum-based, and polybutene-based tackifiers.

In addition, the molecular weight modifier may be at least one selected from the group consisting of alcohol, ether, thioether, dithiocarbonate, natroxide, mercaptan, TEMPO, lauryl mercaptan, n-dodecyl mercaptan, t-dodecyl mercaptan, n-octyl mercaptan, glycidyl mercaptan, mercaptoacetic acid, 2-mercaptoethanol, thioglycolic acid, 2-ethylhexyl thioglycolate, and 2,3-dimercapto-1-propanol.

The crosslinking agent may be at least one selected from the group consisting of allyl methacrylate, 1,6-hexanediol diacrylate, ethylene glycol dimethacrylate, polyethylene glycol diacrylate, polypropylene glycol diacrylate, ethylene glycol diacrylate, ethylene glycol dimethacrylate, hexanediol ethoxylate diacrylate, hexanediol propoxylate diacrylate, neopentyl glycol ethoxylate diacrylate, neopentyl glycol propoxylate diacrylate, trimethyl propane ethoxylate triacrylate, trimethyl propane propoxylate triacrylate, pentaerythritol ethoxylate triacrylate, pentaerythritol propoxylate triacrylate, vinyltrimethoxysilane, and divinylbenzene.

The kisstack, which is defined as a force measured when a sheet coated with the adhesive composition is instantaneously peeled off after being attached, may be about 6 N/inch or more.

Meanwhile, according to one embodiment of the present invention, an adhesive sheet, which is formed by coating the adhesive composition as described above onto one side or both sides of the sheet, is provided.

As an example, the adhesive sheet may an art paper.

Effects of the Invention

Since the adhesive composition according to the present invention not only has excellent initial tack but also exhibits kisstack characteristics of 6 N/inch or more, it can enhance an actual feeling adhesive strength that the end user perceives, and provide excellent adhesion to various substrates requiring adhesion, not only to flexible surfaces such as plastic containers such as a cosmetics or pharmaceutical products, and fancy article, but also to hard surfaces such as a cement wall or an iron plate.

DETAILED DESCRIPTION OF THE EMBODIMENTS

As used herein, the terms "first," "second," etc. may be used to describe various components, and these terms are used only for distinguishing one element from others.

Further, terms used herein are used only to describe particular embodiments, and are not intended to be limiting of the invention. The singular expressions are intended to include plural expressions as well, unless the context clearly indicates otherwise. It should be understood that the terms "comprise," "include", "have", etc. are used herein to specify the presence of stated features, numbers, steps, components, or combinations thereof, but do not preclude the presence or addition of one or more other features, numbers, steps, components, or combinations thereof.

Since the embodiments of the present invention are susceptible to various modifications and alternative forms, specific embodiments thereof will be illustrated and described in detail below. It should be understood, however, that the present invention is not limited to the particular embodiments disclosed, but on the contrary, the invention is to cover all modifications, equivalents, and alternatives falling within the spirit and scope of the invention.

Hereinafter, the present invention will be described in more detail.

According to one embodiment of the invention, an adhesive composition not only having excellent initial tack but also exhibiting high kisstack characteristics is provided.

The adhesive composition includes acrylic emulsion resin particles, and about 1 to 45 parts by weight of a water dispersible tackifier based on 100 parts by weight of the acrylic emulsion resin particles.

Herein, the acrylic emulsion resin particles are obtained by reaction between a (meth)acrylic acid ester monomer having a C1-C14 alkyl group, and 0.1 to 4.5 parts by weight of a monomer having a carboxyl group and/or a hydroxy group, or a mixture thereof, 0.5 to 12 parts by weight of a styrene-based monomer, 1 to 30 parts by weight of a vinyl acetate-based monomer, 0.01 to 2 parts by weight of a molecular weight modifier, and 0.01 to 2 parts by weight of a crosslinking agent, based on 100 parts by weight of the (meth)acrylic acid ester monomer.

The present inventors repeatedly performed various experiments, and as a result, found that when using an adhesive composition having a predetermined amount of physical properties defined by kisstack, an intended effect can be achieved, thereby completing the present invention.

In particular, in the adhesive composition of the present invention, the kisstack, which is defined as a force measured when a sheet coated with the adhesive composition is instantaneously peeled off after being attached, is excellently exhibited at about 6 N/inch or more.

Here, the kisstack can qualitatively, quickly, and easily evaluate the level of physical properties of the adhesive sheet, and numerically represents the large or small volume of fibrils, by force (N/inch), formed through the steps of facing the surfaces coated with the adhesive to each other, lightly adhering the facing attachment surfaces, and immediately peeling off the attachment surfaces attached to each other.

The adhesive composition according to the present invention not only exhibits high initial tack while securing the shear resistance at an equivalent level, but also secures excellent kisstack characteristics without blending a rubber-based resin with an acrylic adhesive, and therefore, can be used for the surface of various materials.

Specifically, the kisstack can be defined as a force (N/inch) measured while cutting a sheet coated with an adhesive composition, attaching a portion coated with the adhesive composition, and then peeling off it in a direction of 180 degrees at a rate of 300 mm/min after 1 second. Specifically, the adhesive composition can be defined as a force measured by cutting a coated sheet to a width of 1 inch, and the length of the sheet is not limited.

The kisstack in the composition according to the present invention may be about 6 N/inch or more, or 6 N/inch to 13 N/inch, and more specifically, it may be about 6.5 N/inch or more, or 6.5 N/inch to 10 N/inch. If the kisstack is excessively low, the desired adhesive properties cannot be sufficiently exhibited, and thus it may be about 6 N/inch or more, or about 6.5 N/inch. However, if the kisstack is too high, interface destruction may occur between an adhesive layer and a substrate surface, and thus, it may be about 13 N/inch or less, or about 10 N/inch or less.

Here, the advantage of measuring kisstack characteristics is to numerically represent the actual feeling part of the adhesive strength that the end user using an adhesive label perceives. Usually, since the end user who uses actual labels does not have the equipment capable of measuring peel strength, it is frequently determined by measuring hand peel or hand tack, or by hand-touching while sticking the adhesive faces together and peeling them apart. The kisstack used herein numerically represents the peel strength which occurs when sticking the adhesive faces together and peeling them apart among these actual feeling adhesive properties. The pressure applied when sticking the adhesive surfaces together is formed by the elasticity of the adhesive label, and it is a very small pressure that presses the substrate when measuring the initial tack (loop tack). When peeling off the adhesive surface even after weak pressure is applied in this way, a strong force is applied while considerable burrs are generated. Therefore, from the standpoint of the end user, it is possible to distinguish it as an adhesive having excellent adhesive strength. The burr is a phenomenon in which when the adhesive is removed, it does not immediately peel off and the adhesive is stretched like a thread, and it is a criterion for visually judging how well the adhesive comes into contact with the substrate and strongly sticks to it. As the occurrence of burrs increases, the kisstack value will be higher. If it is usually about 4 N/inch or more, it can be said that visible burrs are formed. When measuring the actual feeling tack by hand, it is necessary to have a value of about 6 N/inch or more in order to strongly feel the adhesive strength.

As described above, the adhesive composition includes acrylic emulsion resin particles and 1 to 45 parts by weight of a water dispersible tackifier based on 100 parts by weight of the acrylic emulsion resin particles.

Here, the acrylic emulsion resin particles are obtained by reaction between a (meth)acrylic acid ester monomer having a C1-C14 alkyl group, a monomer having a carboxyl group and/or a hydroxy group, or a mixture thereof, a styrene-based monomer, a vinyl acetate-based monomer, and the like, together with a molecular weight modifier and a crosslinking agent.

As explained above, the (meth)acrylic acid ester monomer having a C1-C14 alkyl group, that is, the (meth)acrylic acid ester monomer having an alkyl group having 1 to 14 carbon atoms, is not limited as long as it is a material known in the art. However, for example, the (meth)acrylic acid ester monomer may be any one selected from the group consisting of methyl (meth)acrylate, ethyl (meth)acrylate, propyl (meth)acrylate, isopropyl (meth)acrylate, butyl (meth)acrylate, isobutyl (meth)acrylate, t-butyl (meth)acrylate, n-amyl (meth)acrylate, isoamyl (meth)acrylate, n-hexyl (meth)acrylate, n-heptyl (meth)acrylate, n-octyl (meth)acrylate, t-octyl (meth)acrylate, n-ethylhexyl (meth)acrylate, 2-ethylhexyl (meth)acrylate, decyl (meth)acrylate, isodecyl (meth)acrylate, tridecyl (meth)acrylate, stearyl (meth)acrylate, isostearyl(meth)acrylate, phenyl (meth)acrylate, benzyl (meth)acrylate, dodecyl (meth)acrylate, cyclohexyl (meth)acrylate, lauryl (meth)acrylate, seryl (meth)acrylate, and glycidyl (meth)acrylate, or a combination of two or more thereof. Specifically, one or more selected from methyl (meth)acrylate, ethyl (meth)acrylate, butyl (meth)acrylate, and 2-ethylhexyl (meth)acrylate can be preferably used.

The composition according to the present invention further includes a monomer containing a functional group in addition to the (meth)acrylate-based monomer, and specifically, the functional group may be any one selected from the group consisting of a carboxyl group, a hydroxy group, an epoxy group, a vinyl ester group, a cyano group, and a styrene group, or a combination of two or more thereof. In particular, it includes at least one monomer having a carboxyl group and/or a hydroxy group, or a mixture thereof, at least one styrene-based monomer, and at least one vinyl acetate-based monomer.

As one example, a monomer containing a carboxyl group includes (meth)acrylic acid, maleic acid, maleic anhydride, fumaric acid, fumaric anhydride, crotonic acid, anhydrous crotonic acid, itaconic acid, anhydrous itaconic acid, myristoleic acid, palmitoleic acid, and oleic acid, but is not limited thereto.

The monomer containing a hydroxy group includes hydroxyethyl (meth)acrylate, hydroxypropyl (meth)acrylate, hydroxybutyl (meth)acrylate, hydroxyhexyl (meth)acrylate, hydroxyoctyl (meth)acrylate, hydroxydecyl (meth)acrylate, hydroxylauryl (meth)acrylate, and hydroxypropyl glycol (meth)acrylate, but is not limited thereto.

Here, the monomer having a carboxyl group and/or a hydroxy group, or a mixture thereof, may be mixed and reacted in an amount of about 0.1 to 4.5 parts by weight, preferably about 0.2 to 4 parts by weight, or about 0.5 to 3 parts by weight, based on 100 parts by weight of the (meth)acrylic acid ester monomer. The monomer having a carboxyl group and/or a hydroxyl group or a mixture thereof should be mixed and reacted in an amount of about 0.1 part by weight or more in terms of ensuring excellent latex stability and shear resistance, and it is mixed and reacted in an amount of about 4.5 parts by weight or less from the viewpoint of preventing a decrease in tack properties and an increase in latex viscosity.

The monomer including the styrene includes styrene and α-methylstyrene, but is not limited thereto.

Here, the styrene-based monomer may be mixed and reacted in an amount of about 0.5 to 12 parts by weight, preferably about 1 to 8 parts by weight, or about 1 to 5 parts by weight, based on 100 parts by weight of the (meth)acrylic acid ester monomer. The styrene-based monomer should be mixed and reacted in an amount of about 1 part by weight or more from the viewpoint of sufficient kisstack expressions, and it is mixed and reacted in an amount of about 12 parts by weight or less from the viewpoint of preventing the deterioration of tack properties with hardening of the adhesive resin.

The monomer containing the vinyl ester group, that is, the vinyl acetate-based monomer, is vinyl acetate, vinyl propionate, vinyl laurate, or vinylpyrrolidone, but is not limited thereto.

Here, the vinyl acetate-based monomer may be mixed and reacted in an amount of about 1 to 30 parts by weight, preferably about 3 to 26 parts by weight, or about 5 to 20 parts by weight, based on 100 parts by weight of the (meth)acrylic acid ester monomer. The vinyl acetate-based monomer should be mixed and reacted in an amount of about 1 part by weight or more in view of sufficient kisstack expression, and it should be mixed and reacted in an amount of about 30 parts by weight or less from the viewpoint of maintaining latex stability.

In addition, monomers having various functional groups may be added, and for example, a monomer containing an epoxy group or a cyano group can be used. The monomer containing an epoxy group includes, but is not limited to, glycidyl methacrylate and allyl glycidyl ether. The monomer containing a cyano group includes, but is not limited to, acrylonitrile and methacrylonitrile. Here, the monomer containing the epoxy group or cyano group may be mixed and reacted in an amount of about 5 parts by weight or less, about 0 to 5 parts by weight, about 3 parts by weight or less, or about 0 to 3 parts by weight, based on 100 parts by weight of the (meth)acrylic acid ester monomer.

In the present invention, the acrylic emulsion resin particles are obtained by reacting a (meth)acrylic acid ester monomer having a C1-C14 alkyl group as described above and monomers having various functional groups together with a molecular weight modifier and a crosslinking agent.

In the present invention, the molecular weight modifier may be, for example, at least one selected from the group consisting of an alcohol, ether, thioether, dithiocarbonate, natroxide, mercaptan, TEMPO, lauryl mercaptan, n-dodecyl mercaptan, t-dodecyl mercaptan, n-octyl mercaptan, glycidyl mercaptan, mercapto acetic acid, 2-mercapto ethanol, thioglycolic acid, 2-ethylhexyl thioglycolate, and 2,3-dimercapto-1-propanol. Of these, n-dodecyl mercaptan and the like can be preferably used.

When the content of the molecular weight modifier is less than about 0.01 part by weight based on 100 parts by weight of the (meth)acrylate monomer, the molecular weight of the adhesive composition becomes excessively high, and so there is a problem that the kisstack is lower than the target value. Further, when the content of the molecular weight modifier is more than about 2 parts by weight based on 100 parts by weight of the acrylic emulsion resin, the kisstack is increased, but the molecular weight of the adhesive composition is lowered, and thus the cohesive force of the resin is excessively insufficient and the shear resistance is significantly lowered, and the interface destruction occurs between a substrate layer and an adhesive. Accordingly, the content of the molecular weight modifier may be about 0.01 to 2 parts by weight, preferably about 0.05 to 1 part by weight, or about 0.15 to 0.5 parts by weight, based on 100 parts by weight of the acrylic emulsion resin particles.

In the present invention, the crosslinking agent is, for example, at least one selected from the group consisting of allyl methacrylate, 1,6-hexanediol diacrylate, ethylene glycol dimethacrylate, polyethylene glycol diacrylate, polypropylene glycol diacrylate, ethylene glycol diacrylate, ethylene glycol dimethacrylate, hexanediol ethoxylate diacrylate, hexanediol propoxylate diacrylate, neopentyl glycol ethoxylate diacrylate, neopentyl glycol propoxylate diacrylate, trimethyl propane ethoxylate triacrylate, trimethyl propane propoxylate triacrylate, pentaerythritol ethoxylate triacrylate, pentaerythritol propoxylate triacrylate, vinyltrimethoxysilane, vinylbenzene, and the like.

When the content of the crosslinking agent is less than about 0.01 part by weight based on 100 parts by weight of the acrylic emulsion resin, the degree of crosslinking is not sufficient and thus it is difficult to secure shear resistance at the target level. When the content of the crosslinking agent exceeds about 2 parts by weight based on 100 parts by weight of the acrylic emulsion resin, the initial tack and kisstack may be lowered. Accordingly, the content of the crosslinking agent may be about 0.01 to 2 parts by weight, preferably about 0.05 to 1 part by weight, or about 0.05 to 0.1 parts by weight, based on 100 parts by weight of the acrylic emulsion resin particles.

Meanwhile, the acrylic emulsion resin can be neutralized with an alkaline substance for storage stability.

The alkali neutralizing agent is, for example, at least one selected from the group consisting of a hydroxide, chloride, or carbonate of a divalent metal, ammonia water, and an organic amine. Specifically, it may be ammonia water or an organic amine. In particular, in the present invention, ammonia water may be used for securing kisstack. An about 20%-35% aqueous ammonia solution may be preferably used. Specifically, the alkali neutralizing agent may be about 0.5 to 1.5 parts by weight based on 100 parts by weight of the acrylic emulsion resin (A), and may be an about 20%-35% aqueous ammonia solution.

The composition according to the present invention includes about 1 to 45 parts by weight of a water dispersible tackifier based on 100 parts by weight of the acrylic emulsion resin particles, and it may preferably include about 10 to 40 parts by weight or about 15 to 35 parts by weight of a water dispersible tackifier. When the content of the water dispersible tackifier is excessively lowered to less than 1 part by weight, the initial tack force and the peeling force are lowered, which is not preferable. When the content is excessively increased to more than 45 parts by weight, the shear resistance may be decreased, which is not preferable.

Meanwhile, in the present invention, the softening point (Ts) is a temperature at which a polymer material begins to deform or soften due to heating. Generally, the softening point (Ts) of the tackifier has a value higher than the glass transition temperature (Tg) of the adhesive resin. Therefore, if the water dispersible tackifier is compatible with the adhesive resin, the Tg of the mixed composition tends to increase. The greater the amount added, the higher the Tg of the adhesive composition. Since an increase in the Tg of such adhesive composition allows the adhesive force to reduce at low temperatures, a tackifier having a suitable softening point (Ts) should be added in an appropriate amount.

In addition, since the tackifier is mostly a low molecular weight substance, a larger amount used contributes to lowering the cohesive force of the adhesive resin.

Therefore, in order for the water dispersible tackifier to exhibit the desired adhesive strength in the present invention, the softening point Ts is preferably 0° C. or more, specifically 0° C. to 170° C., more preferably 50° C. to 160° C., and still more preferably 70° C. to 120° C. The tackifier having a softening point (Ts) of less than 0° C. does not contribute to increasing loop tack of the adhesive composition, and even if only a small amount thereof is used, the effect of reducing a shear resistance of the adhesive composition is large, which is not preferable.

In the present invention, the glass transition temperature (Tg) of the adhesive composition including such a water dispersible tackifier may be −60° C. to −20° C.

The water dispersible tackifier may be at least one selected from the group consisting of a rosin-based, terpene-based, xylene-based, petroleum-based, and polybutene-based tackifier.

The adhesive composition of the present invention may further include additives and adjuvants that are commonly employed in the art, in addition to the above-mentioned components. For example, additives such as an emulsifier, an antifoaming agent, a wetting agent, a thickener, a dispersant, an ultraviolet stabilizer, an antioxidant, an anticorrosion agent, and a filler may be further added if necessary.

Meanwhile, the adhesive composition not only has excellent loop tack but also exhibits high kisstack characteristics. The kisstack of the adhesive composition may be about 6 N/inch or more, or 6 N/inch to 13 N/inch, and more specifically, it may be about 6.5 N/inch or more, or 6.5 N/inch to 10 N/inch. Further, the adhesive composition has loop tack of about 20 N/inch or more, about 20 to 40 N/inch, about 24 N/inch or more, or about 24 to 40 N/inch, which is measured under the conditions of a temperature of 23° C. and humidity of 50% according to the FINAT Test Method FTM 9 as described in experimental examples described hereinafter.

Meanwhile, according to another embodiment of the invention, an adhesive sheet which is formed by coating the adhesive composition as described above onto one side or both sides of the sheet is provided.

The adhesive composition may be coated onto one side or both sides of the adhesive sheet as a surface sheet for an adhesive label, and the adhesive layer may have a thickness of about 15 to 25 micrometers (μm).

The adhesive sheet can provide excellent adhesion to various substrates requiring adhesion, for example, the surface of flexible containers such as plastic containers of cosmetics or pharmaceutical products, or fancy goods, but also hard surfaces such as cement walls or steel plates, and thus can be used for films or paper sheets such as PVC, PET, PP, PE, or the like, or other sheets requiring adhesion. Specifically, it can be suitably used for an art paper applied to a plastic surface, a glass surface, a box surface, a surface of an electronic product, or the like through appropriate printing among paper sheets. Such an art paper may have a thickness of about 65 to 150 μm depending on the intended purpose and use of the art paper, and usually, white art paper having a thickness of about 80 μm and that is glossy on the surface can be preferably used.

In order to coat and protect the adhesive, increase the storability of the product, and ensure the smoothness of the product, a paper release paper whose surface is coated with silicone can be laminated on the adhesive layer, and a Kraft paper or a glassine paper having a thickness of about 100 to 150 μm can be used as the paper release paper.

DETAILED DESCRIPTION OF THE EMBODIMENTS

The present invention will now be described with reference to preferred examples. However, these examples are provided for better understanding of the invention and the scope of the present invention is not limited thereto.

EXAMPLES

Example 1

1-1. Preparation of Acrylic Emulsion Resin

To a 2 L glass reactor equipped with a thermostat, a stirrer, a dropping funnel, a nitrogen gas injection tube, and a reflux condenser were added about 200 g of ion-exchanged water, to which about 1 g of sodium polyoxyethylene aryl ether sulfate having a concentration of about 26 wt % was added. The inside of the reactor was replaced with nitrogen while stirring the resulting mixture, and then the temperature therein was raised to 80° C. in a nitrogen atmosphere and maintained for 60 minutes.

Separately, an aqueous solution consisting of about 7 g of a sodium alkyl diphenyl oxide disulfonate solution having a concentration of about 50 wt %, about 10 g of sodium polyoxyethylene alkyl ether sulfate having a concentration of about 26 wt %, about 2 g of sodium carbonate, and about 210 g of water was added to a 2 L beaker together with a monomer mixture mixed by adding about 575.5 g of 2-ethylhexyl acrylate (2-EHA), about 35 g of methyl methacrylate (MMA), about 14 g of styrene (ST), about 70 g of vinyl acetate (VAc), about 7 g of acrylic acid (AA), about 0.5 g of poly(ethylene glycol)diacrylate (PEGDA), and about 1 g of a molecular weight modifier, and the resulting solution was mixed with a stirrer to prepare a milky mixture, namely, a pre-emulsion.

The pre-emulsified mixture prepared as described above, namely, the pre-emulsion, was allowed to react while adding it dropwise to the reactor at a constant rate for a total of 4 hours. At this time, about 90 g of an ammonium persulfate solution having a concentration of about 10 wt % was added to the reactor at a constant rate concurrently with the pre-emulsion and dripped over a total of 4 hours. After completion of the dropwise addition, the resulting solution was maintained at a temperature of about 80° C. for about 2 hours to complete the reaction of unreacted monomers, and then cooled to room temperature to prepare an acrylic emulsion resin.

After cooling the acrylic emulsion resin to room temperature, an aqueous ammonia solution having a concentration of about 30 wt % was added to adjust the pH to about 8.5.

1-2. Preparation of Adhesive Composition

About 30 g of a 50% rosin-based water dispersible tackifier was added to 100 g of the acrylic emulsion resin prepared in step 1-1, was stirred for about 10 minutes, and then about 1 g of 65% sodium dodecyl sulfosuccinate was added thereto and stirred for about 30 minutes.

Example 2

An adhesive composition was prepared in the same manner as in Example 1, except that the amount of the styrene monomer was reduced to about 7 g, and the amount of methyl methacrylate was increased to about 42 g, as shown in Table 1 below.

Example 3

3-1. Preparation of Acrylic Emulsion Resin

To a 2 L glass reactor equipped with a thermostat, a stirrer, a dropping funnel, a nitrogen gas injection tube, and a reflux condenser was added about 200 g of ion-exchanged water, to which about 1 g of sodium polyoxyethylene aryl ether sulfate having a concentration of about 26 wt % was added. The inside of the reactor was replaced with nitrogen while stirring the resulting mixture, and then the temperature therein was raised to 80° C. in a nitrogen atmosphere and maintained for 60 minutes.

Separately, an aqueous solution consisting of about 7 g of a sodium alkyl diphenyl oxide disulfonate solution having a concentration of about 50 wt %, about 10 g of sodium polyoxyethylene alkyl ether sulfate having a concentration of about 26 wt %, about 2 g of sodium carbonate, and about 210 g of water was added to a 2 L beaker together with a monomer mixture mixed by adding about 590.5 g of 2-ethylhexyl acrylate (2-EHA), about 70 g of styrene (ST), about 35 g of vinyl acetate (VAc), about 7 g of acrylic acid (AA), about 0.5 g of polyethylene glycol diacrylate (PEGDA), and about 0.5 g of a molecular weight modifier, and the resulting solution was mixed with a stirrer to prepare a milky mixture, namely, a pre-emulsion.

The pre-emulsified mixture prepared as described above, namely, the pre-emulsion, was allowed to react while adding it dropwise to the reactor at a constant rate for a total of 4 hours. At this time, about 90 g of ammonium persulfate solution having a concentration of about 10 wt % was added to the reactor at a constant rate concurrently with the pre-emulsion and dripped for a total of 4 hours. After completion of the dropwise addition, the resulting solution was maintained at a temperature of about 80° C. for about 2 hours to complete the reaction of unreacted monomers, and then cooled to room temperature to prepare an acrylic emulsion resin.

After cooling the acrylic emulsion resin to room temperature, an aqueous ammonia solution having a concentration of about 30 wt % was added to adjust the pH to about 8.5.

3-2. Preparation of Adhesive Composition

About 30 g of a 50% rosin-based water dispersible tackifier was added to 100 g of the acrylic emulsion resin prepared in step 3-1, stirred for about 10 minutes, and then about 1 g of 65% sodium dodecyl sulfosuccinate was added thereto and stirred for about 30 minutes.

Example 4

4-1. Preparation of Acrylic Emulsion Resin

To a 2 L glass reactor equipped with a thermostat, a stirrer, a dropping funnel, a nitrogen gas injection tube, and a reflux condenser were added about 200 g of ion-exchanged water, to which about 1 g of sodium polyoxyethylene aryl ether sulfate having a concentration of about 26 wt % was added.

The inside of the reactor was replaced with nitrogen while stirring the resulting mixture, and then the temperature therein was raised to 80° C. in a nitrogen atmosphere and maintained for 60 minutes. Separately, an aqueous solution consisting of about 7 g of a sodium alkyl diphenyl oxide disulfonate solution having a concentration of about 50 wt %, about 10 g of sodium polyoxyethylene alkyl ether sulfate having a concentration of about 26 wt %, about 2 g of sodium carbonate, and about 210 g of water was added to a 2 L beaker together with a monomer mixture mixed by adding about 513.5 g of 2-ethylhexyl acrylate (2-EHA), about 28 g of methyl methacrylate (MMA), about 14 g of styrene (ST), about 140 g of vinyl acetate (VAc), about 7 g of acrylic acid (AA), about 0.5 g of polyethylene glycol diacrylate (PEGDA), and about 1 g of a molecular weight modifier, and the resulting solution was mixed with a stirrer to prepare a milky mixture, namely, a pre-emulsion.

The pre-emulsified mixture prepared as described above, namely, the pre-emulsion, was allowed to react while adding dropwise to the reactor at a constant rate for a total of 4 hours. At this time, about 90 g of an ammonium persulfate solution having a concentration of about 10 wt % was added to the reactor at a constant rate concurrently with the pre-emulsion and dripped for a total of 4 hours. After completion of the dropwise addition, the resulting solution was maintained at a temperature of about 80° C. for about 2 hours to complete the reaction of unreacted monomers, and then cooled to room temperature to prepare an acrylic emulsion resin.

After cooling the acrylic emulsion resin to room temperature, an aqueous ammonia solution having a concentration of about 30 wt % was added to adjust the pH to about 8.5.

4-2. Preparation of Adhesive Composition

To 100 g of the acrylic emulsion resin prepared in step 4-1 was added about 30 g of 50% rosin-based water dispersible tackifier, stirred for about 10 minutes, and then about 1 g of 65% sodium dodecyl sulfosuccinate was added thereto and stirred for about 30 minutes.

Comparative Example 1

An adhesive composition was prepared in the same manner as in Example 1, except that the styrene monomer was not used, and the amount of methyl methacrylate was increased to about 49 g, as shown in Table 1 below.

Comparative Example 2

An adhesive composition was prepared in the same manner as in Comparative Example 1, except that the amount of a molecular weight modifier was increased to 1.5 g, and the amount of 2-ethyl hexyl acrylate was reduced to 575 g, as shown in Table 1 below.

Comparative Example 3

An adhesive composition was prepared in the same manner as in Example 1, except that a tackifier was not used, as shown in Table 1 below.

Comparative Example 4

An adhesive composition was prepared in the same manner as in Example 1, except that the amount of a tackifier was increased to 50 g, as shown in Table 1 below.

Comparative Example 5

An adhesive composition was prepared in the same manner as in Example 1, except that about 575.5 g of 2-ethylhexyl acrylate, about 84 g of methyl methacrylate, about 35 g of styrene, about 7 g of acrylic acid, and about 0.5 g of polypropylene glycol diacrylate were used, as shown in Table 1 below.

Comparative Example 6

An adhesive composition was prepared in the same manner as in Example 1, except that n-dodecyl mercaptan was not used, and the amount of 2-ethylhexyl acrylate was increased to about 585.5 g as shown in Table 1 below.

Comparative Example 7

An adhesive composition was prepared in the same manner as in Example 1, except that about 510.5 g of 2-ethylhexyl acrylate and about 80 g of styrene were used as shown in Table 1 below.

Comparative Example 8

An adhesive composition was prepared in the same manner as in Example 1, except that about 15 g of polyethylene glycol diacrylate (PEGDA) was used as a crosslinking agent, as shown in Table 1 below.

Experimental Example

Preparation of Adhesive Sheet

Each of the adhesive compositions prepared in the examples and comparative examples was coated onto a silicon-coated release paper, and the coated release paper was dried in an oven at 110° C. for about 2 minutes to form an adhesive resin coating layer having a thickness of about 20 μm. The adhesive resin coated on the silicone release paper was laminated with art paper to form an adhesive paper. The adhesive paper was cut to a size of 25 mm×200 mm, thereby completing fabrication of an adhesive tape specimen.

Evaluation of Physical Properties

1) Measurement of Loop Tack (Initial Tack)

The loop tack of the adhesive sheet prepared above was measured according to the FINAT Test Method FTM-9.

After preparing a specimen with a size of 1 inch×20 cm, the release paper was removed, both sides of the sheet were folded to form a loop shape, and then both ends were fixed. When this loop was instantaneously attached to the glass surface and then separated in the reverse direction at a rate of 300 mm/min, force corresponding to the maximum force was measured in a measurement environment of 23° C. and 50% humidity. After preparing five or more measurement specimens, the loop tack was measured and averaged. The target value was set to 16 N/inch or more.

2) Measurement of Shear Resistance

The shear resistance of the adhesive sheet prepared above was measured according to the FINAT Test Method FTM-8.

After preparing a specimen with a size of 1 inch×20 cm, the stainless steel surface and the attachment surface were attached to be 0.5 inch×0.5 inch, and then pressed by reciprocating with a 2 kg roller twice. After 10 minutes, the attached sheet was attached to a wall surface tilted by about 2 degrees. A weight of 500 g load was applied to the lower end, and the time until the sheet falls from the attachment surface was measured in a measurement environment of 23° C. and 50% humidity.

3) Measurement of Kisstack

The adhesive sheet prepared above was cut to a width of 1 inch and a length of 15 cm, the release paper was peeled, and the both ends of the sheet were fixed. The adhesive force at the time when the adhesive agent in the center portion of the sheet comes into contact with each other momentarily and then is peeled after 1 second is measured while peeling off in the direction of 180 degrees at a rate of 300 mm/min. After preparing five or more measurement specimens, kisstack was measured and then averaged. The target value was set to 6 N/inch or more.

The loop tack, shear resistance, and kisstack of the adhesive sheet prepared by coating the adhesive composition prepared in the examples and comparative examples are shown in Table 1 below.

Further, when the tackifier is not presented, the kisstack is decreased to about 3.27 N/inch as in Comparative Example 3. Even if the tackifier is present, excessive use thereof shows that the kisstack is reduced sharply to about 2.9 N/inch as in Comparative Example 4. In particular, when the tackifier is used in an excess amount as in Comparative Example 4, an adhesive having high tack properties can be produced, but although the tack value is high, it does not necessarily increase the kisstack.

Meanwhile, in the absence of vinyl acetate as in Comparative Example 5, even if the shear resistance is low and the adhesion value is high, the kisstack value is remarkably lowered to about 2.9 N/inch. Further, even if the resin particles are produced by optimizing all the monomers as in Comparative Example 6, the kisstack properties are not

TABLE 1

| | Monomer mixture (g) | | | | | | | | | | Shear |
|---|---|---|---|---|---|---|---|---|---|---|---|
| | 2-EHA | MMA | AA | ST | VAc | Crosslinking agent | Molecular weight modifier | Tackifier (part by weight*) | Kisstack (N/inch) | Loop tack (N/inch, Glass) | (min, 0.5 inch*0.5 inch, 500 g) |
| Example 1 | 575.5 | 35 | 7 | 14 | 70 | 0.5 | 1.0 | 30 | 7.9 | 33.6 | 5 |
| Example 2 | 575.5 | 42 | 7 | 7 | 70 | 0.5 | 1.0 | 30 | 6.7 | 24.2 | 25 |
| Example 3 | 590.5 | 0 | 7 | 70 | 35 | 0.5 | 1.0 | 30 | 6.5 | 31.7 | 7 |
| Example 4 | 513.5 | 28 | 7 | 14 | 140 | 0.5 | 1.0 | 20 | 6.6 | 25.1 | 30 |
| Comparative Example 1 | 575.5 | 49 | 7 | 0 | 70 | 0.5 | 1.0 | 30 | 3.9 | 18.1 | 130 |
| Comparative Example 2 | 575.5 | 49 | 7 | 0 | 70 | 0.5 | 1.5 | 30 | 5.2 | 18.6 | 22 |
| Comparative Example 3 | 575.5 | 35 | 7 | 14 | 70 | 0.5 | 1.0 | 0 | 3.2 | 16.3 | 1088 |
| Comparative Example 4 | 575.5 | 35 | 7 | 14 | 70 | 0.5 | 1.0 | 50 | 2.9 | 27.3 | 41 |
| Comparative Example 5 | 575.5 | 84 | 7 | 35 | 0 | 0.5 | 1.0 | 30 | 2.9 | 25.3 | 6 |
| Comparative Example 6 | 585.5 | 35 | 7 | 14 | 70 | 0.5 | 0 | 30 | 4.1 | 26.4 | 155 |
| Comparative Example 7 | 450.5 | 35 | 7 | 140 | 70 | 0.5 | 1.0 | 30 | 3.1 | 12.4 | 3230 |
| Comparative Example 8 | 575.5 | 35 | 7 | 14 | 70 | 15 | 1.0 | 30 | 1.5 | 10.1 | 8210 |

*part by weight of tackifier based on 100 parts by weight of acrylic emulsion resin particles As shown in Table 1, it can be confirmed that in the case of Examples 1 to 4 in which an acrylic emulsion resin prepared by reacting a monomer with a molecular weight modifier, and a crosslinking agent in the optimum range, and a water dispersible tackifier were used in the optimum range according to the present invention, the loop tack and kisstack are significantly improved while securing the shear resistance at an equivalent level. In particular, it can be confirmed that in the case of Examples 2 and 4, very high kisstack of about 6.7 N/inch and about 6.6 N/inch was exhibited, whereas Comparative Examples 2 and 4, which are equivalent in shear resistance, exhibit kisstack of about 5.2 N/inch and about 2.9 N/inch, respectively.

On the other hand, it can be seen that in the case of Comparative Examples 1 to 8, the loop tack and kisstack are remarkably lowered on the basis of the shear resistance range of equivalent levels. In particular, if styrene is not present as in Comparative Example 1, the kisstack is remarkably lowered to about 3.9 N/inch. In addition, it can be seen that when the content of the molecular weight modifier is increased as in Comparative Example 2, the kisstack is increased, but it exhibits a remarkably lower kisstack value than that of Example 2 having similar shear resistance. Thereby, it can be seen that simultaneously using styrene and vinyl acetate helps to improve the kisstack.

increased even in the case of not including the molecular weight modifier, and the kisstack is only about 4.1 N/inch. When styrene is contained in an excess amount as in Comparative Example 7, the kisstack is also reduced to about 3.17 N/inch and the loop tack is remarkably lowered to about 12.4 N/inch. Further, when the crosslinking agent is contained in an excess amount as in Comparative Example 8, it can be seen that the kisstack is significantly lowered to about 1.5 N/inch.

The invention claimed is:

1. An adhesive composition including acrylic emulsion resin particles, and 15 to 45 parts by weight of a water dispersible tackifier based on 100 parts by weight of the acrylic emulsion resin particles,
    wherein the acrylic emulsion resin particles are obtained by a reaction between a (meth)acrylic acid ester monomer having a $C_1$-$C_{14}$ alkyl group, and
    0.5 to 3 parts by weight of at least one monomer selected from a monomer having a carboxyl group, a monomer having a hydroxy group, and a monomer having carboxyl and hydroxy groups, 0.5 to 12 parts by weight of a styrene-based monomer, 1 to 30 parts by weight of a vinyl ester-based monomer, 0.01 to 2 parts by weight of a molecular weight modifier, and 0.01 to 2 parts by weight of a crosslinking agent, based on 100 parts by weight of the (meth)acrylic acid ester monomer, wherein shear resistance, measured according to the FINAT Test Method FTM-8 is 5 min to 30 min.

2. The adhesive composition according to claim 1, wherein the (meth)acrylic acid ester monomer having a $C_1$-$C_{14}$ alkyl group is at least one selected from the group consisting of methyl (meth)acrylate, ethyl (meth)acrylate, propyl (meth)acrylate, isopropyl (meth)acrylate, butyl (meth)acrylate, t-butyl (meth)acrylate, 2-ethylhexyl (meth) acrylate, octyl (meth)acrylate, and lauryl (meth)acrylate.

3. The adhesive composition according to claim 1, wherein the monomer having a carboxyl group is at least one selected from the group consisting of maleic anhydride, fumaric acid, crotonic acid, itaconic acid, acrylic acid, and methacrylic acid.

4. The adhesive composition according to claim 1, wherein the monomer having a hydroxy group is at least one selected from the group consisting of hydroxyethyl (meth) acrylate, hydroxypropyl (meth)acrylate, hydroxybutyl (meth)acrylate, hydroxyhexyl (meth)acrylate, hydroxyoctyl (meth)acrylate, hydroxylauryl (meth)acrylate, and hydroxypropyl glycol (meth)acrylate.

5. The adhesive composition according to claim 1, wherein the styrene-based monomer is at least one member selected from the group consisting of styrene and α-methylstyrene.

6. The adhesive composition according to claim 1, wherein the vinyl ester-based monomer is at least one selected from the group consisting of vinyl acetate, vinyl propionate, vinyl laurate, and vinyl pyrrolidone.

7. The adhesive composition according to claim 1, wherein the water dispersible tackifier is at least one selected from the group consisting of a rosin-based, terpene-based, xylene-based, petroleum-based, and polybutene-based tackifier.

8. The adhesive composition according to claim 1, wherein the molecular weight modifier is at least one member selected from the group consisting of alcohol, ether, thioether, dithiocarbonate, natroxide, mercaptan, TEMPO, lauryl mercaptan, n-dodecyl mercaptan, t-dodecyl mercaptan, n-octyl mercaptan, glycidyl mercaptan, mercaptoacetic acid, 2-mercaptoethanol, thioglycolic acid, 2-ethylhexyl thioglycolate, and 2,3-dimercapto-1-propanol.

9. The adhesive composition according to claim 1, wherein the crosslinking agent is at least one selected from the group consisting of allyl methacrylate, 1,6-hexanediol diacrylate, ethylene glycol dimethacrylate, polyethylene glycol diacrylate, polypropylene glycol diacrylate, ethylene glycol diacrylate, ethylene glycol dimethacrylate, hexanediol ethoxylate diacrylate, hexanediol propoxylate diacrylate, neopentyl glycol ethoxylate diacrylate, neopentyl glycol propoxylate diacrylate, trimethyl propane ethoxylate triacrylate, trimethyl propane propoxylate triacrylate, pentaerythritol ethoxylate triacrylate, pentaerythritol propoxylate triacrylate, vinyltrimethoxysilane, and divinylbenzene.

10. The adhesive composition according to claim 1, wherein a kisstack of the adhesive composition, which is defined as a force measured when a sheet coated with the adhesive composition is instantaneously peeled off after being attached, is 6 N/inch or more.

11. An adhesive sheet, which is formed by coating the adhesive composition according to claim 1 onto one side or both sides of a sheet.

12. The adhesive sheet according to claim 11, wherein the adhesive sheet is art paper.

13. The adhesive composition according to claim 10, wherein the kisstack of the adhesive composition is from 6 N/inch to 13 N/inch.

14. The adhesive composition according to claim 1, wherein a softening point (Ts) of the water dispersible tackifier is 0° C. to 170° C.

15. The adhesive composition according to claim 1, wherein a glass transition temperature (Tg) of the adhesive composition is −60° C. to −20° C.

16. The adhesive composition according to claim 1, wherein a loop tack of the adhesive composition is 20 N/inch or more.

17. An adhesive composition including acrylic emulsion resin particles, and 15 to 45 parts by weight of a water dispersible tackifier based on 100 parts by weight of the acrylic emulsion resin particles, wherein the acrylic emulsion resin particles are obtained by a reaction between a (meth)acrylic acid ester monomer having a $C_1$-$C_{14}$ alkyl group, and 0.5 to 3 parts by weight of at least one monomer selected from a monomer having a carboxyl group, a monomer having a hydroxy group, and a monomer having carboxyl and hydroxy groups, 0.5 to 12 parts by weight of a styrene-based monomer, 1 to 30 parts by weight of a vinyl ester-based monomer, 0.01 to 2 parts by weight of a molecular weight modifier, and 0.01 to 2 parts by weight of a crosslinking agent, based on 100 parts by weight of the (meth)acrylic acid ester monomer, wherein a kisstack of the adhesive composition, which is defined as a force measured when a sheet coated with the adhesive composition is instantaneously peeled off after being attached, is 6 N/inch or more, wherein a loop tack of the adhesive composition is 20 N/inch or more, and wherein shear resistance, measured according to the FINAT Test Method FTM-8 is 5 min to 30 min.

* * * * *